Patented May 26, 1953

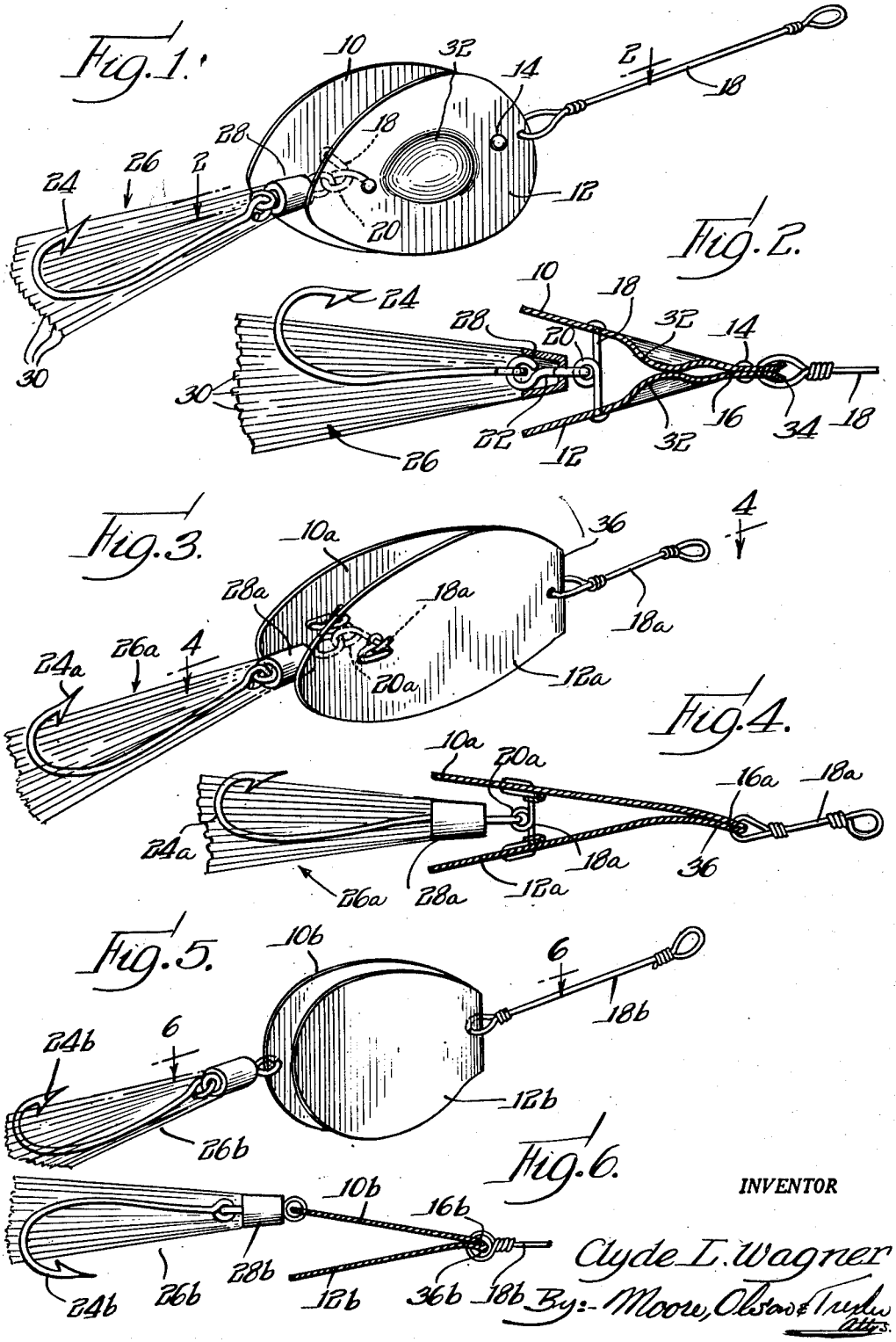

2,639,537

UNITED STATES PATENT OFFICE 2,639,537

FISH LURE

Clyde L. Wagner, Tulsa, Okla.

Application February 12, 1947, Serial No. 728,164

10 Claims. (Cl. 43—42.34)

This invention relates to fish lures, particularly of the spoon type.

An object of the invention is to provide an improved fish lure comprising a double spoon and a portion simulating live bait which is caused to move about in the water in a realistic fashion by the action of the double spoon.

A further object is to provide an improved fish lure wherein two substantially flat plates diverge rearwardly from an acute junction at the leading ends thereof, these plates being constructed and arranged in such a manner as to cause the lure to dart about as it is pulled through the water.

A still further object is to provide an improved fish lure of simple and economical construction wherein a double spoon is formed of plates which are dimpled, bent, or otherwise deformed so that the lure accurately simulates the movement of live bait in the water.

The foregoing and other novel objects, features and advantages of the invention will be apparent from the following description when taken in connection with the accompanying drawing which shows several preferred embodiments of the invention.

In the drawing:

Figure 1 is a perspective view of a fish lure including a double spoon arrangement embodying the principles of the invention;

Figure 2 is a longitudinal section taken on the line 2—2 in Figure 1;

Figure 3 is a perspective view of a modified form of the invention;

Figure 4 is a longitudinal section on the line 4—4 in Figure 3;

Figure 5 is a perspective view of still another modification of the invention; and Figure 6 is a longitudinal section on the line 6—6 in Figure 5.

Referring to Figures 1 and 2, the embodiment of the invention therein illustrated comprises two spoons 10 and 12 each consisting of a metal plate or body portion having an approximately oval or egglike shape. More particularly each plate has a relatively pointed end disposed rearwardly and a relatively rounded end disposed forwardly and forming the leading end of the plate. The plates are joined together at a point spaced from their leading ends by a rivet 14 or in any other suitable manner. The junction 16 of the plates is relatively acute, and the plates in general diverge rearwardly therefrom. A leader wire 18, attached to the leading end or attachment portions of the double spoon, is adapted to be fastened to the fishing line. Near the trailing ends of the spoons or plates 10 and 12 a short length of wire 18 extends between the two plates and is looped at its center to provide an eye 20. A double loop or S-hook 22 connects the barbed fish hook 24 to the eye 20. The ends of the wire 18 may be riveted or welded to the plates 10 and 12, respectively. A skirt 26 consisting of a tab 28 which is fittted around the member 22, and a plurality of strands 30 extending rearwardly therefrom is disposed around the fish hook 24. The skirt 26 is made of rubber or other flexible material and the strands 30 are suitably colored so that the skirt 26, in its appearance and movement in the water, simulates live bait such as worms.

As the lure is drawn through the water, the double spoon imparts a darting motion to the lure. This effect is increased by forming in the plates 10 and 12 dimples 32 which may be aligned or offset, as preferred. Another way in which to increase the action of the lure is to slightly separate the leading ends of the plates 10 and 12 forwardly of the junction 16 as indicated at 34, Figure 2. The resulting motion is very lifelike and has been found extremely effective in deceiving the fish.

Referring now to Figures 3 and 4, there is shown a second embodiment in which the two spoons 10a and 12a are formed as portions of a single plate or piece of metal which is folded back upon itself to provide an acute junction 16a and rearwardly diverging wings. The fish hook 24a is connected to the eye 20a formed in the wire 18a that extends between and interconnects the plates 10a and 12a. The ends of the wire 18a, instead of being welded or riveted to the plates, may be passed through apertures therein and twisted back as shown. A skirt 26a extends rearwardly and surrounds the hook 24a. The desired wobbling or darting motion may be obtained by bending the leading ends of the double spoon near the junction 16a thereof to form an offset lip 36.

In the form of the invention illustrated in Figures 5 and 6, the double spoon consists of a single piece of metal folded back to provide the flat plate portions 10b and 12b, as in the case of the preceding embodiment, having a relatively sharp junction 16b at the leading end thereof. The leader wire 18b is attached to the plates near the junction 16b. The offset lip 36b at the junction serves to increase the action of the lure. The hook 24b, instead of being connected to both plates 10b and 12b, may be directly attached to the trailing end of one plate only as shown.

It will be apparent from the foregoing description that we have provided a fish lure which fulfills the objects of the invention and is a valuable adjunct to the fisherman's equipment. While we have disclosed several preferred embodiments of the invention, there are obviously many other modifications that may be made without departing from the spirit of the invention. Hence, we do not restrict ourselves to the precise details herein disclosed, but wish to avail ourselves of all changes and modifications thereof within the scope of the appended claims.

The invention is hereby claimed as follows:

1. A fish lure comprising a pair of substantially flat metal plates joined together in a relatively acute junction at a point spaced from their leading ends and diverging rearwardly, said plates extending forward of said junction and being slightly separated at their leading ends and diverging forwardly, a fish hook disposed rearwardly of said plates, and means for attaching a fishing line to said plates adjacent the junction thereof.

2. A fish lure as set forth in claim 1, wherein at least one of said plates has a dimple therein.

3. A fish lure comprising a pair of spoons, said spoons having a body portion disposed substantially in a plane, the forward edge of each of said spoons being bent out of the plane of the body portion to form an attachment portion, fastener means interconnecting said spoons at the attachment portion, said body portions diverging rearwardly from said attachment portions, the portions of said attachment portions extending forwardly from the fastener means diverging forwardly to impart increased action to the fish lure, a member extending between and interconnecting said spoons at a point spaced rearwardly from said fastener means, a fish hook attached to said interconnecting member, and a leader wire attached to said spoons adjacent said fastener means.

4. A fish lure comprising a pair of spoons, said spoons having a body portion disposed substantially in a plane, the forward edge of each of said spoons being bent out of the plane of the body portion to form an attachment portion, fastener means interconnecting said spoons at the attachment portion, said body portions diverging rearwardly from said attachment portions, the portions of said attachment portions extending forwardly from the fastener means diverging forwardly to impart increased action to the fish lure, a member extending between and interconnecting said spoons at a point spaced rearwardly from said fastener member, a fish hook attached to said interconnecting member, the body portion of said spoons having a dimple formed therein at a point disposed between said fastener means and said interconnecting member, the material forming said dimples extending inwardly toward the adjacent spoon, and a leader wire attached to said spoons adjacent said fastened member.

5. A fish lure comprising a pair of egg-shaped spoons, said spoons having a relatively pointed end and a rounded end and fastener means interconnecting said spoons adjacent the rounded ends, the portion of the spoons positioned between the fastener means and the rounded ends diverging forwardly to impart increased action to the fish lure and the remaining portions of the spoons diverging rearwardly.

6. A fish lure comprising a pair of egg-shaped spoons, said spoons having a body portion disposed substantially in a plane, said body portions having a relatively pointed end and a rounded end and fastener means interconnecting said spoons adjacent the rounded ends, said body portions diverging rearwardly from said fastener means and the portions of said spoons extending forwardly from the fastener means diverging forwardly to impart increased action to the fish lure.

7. A fish lure comprising a pair of egg-shaped spoons, said spoons having a body portion disposed substantially in a plane, said body portions having a relatively pointed end and a rounded end and fastener means interconnecting said spoons adjacent the rounded ends, said body portions diverging rearwardly from said fastener means, the portions of said spoons extending forwardly from the fastener means diverging forwardly to impart increased action to the fish lure, the body portion of said spoons having a dimple formed therein at a point disposed rearwardly from said fastener means and the material forming said dimples extending inwardly toward the adjacent spoon.

8. A fish lure comprising a pair of egg-shaped spoons, said spoons having a body portion disposed substantially in a plane, said body portions having a relatively pointed end and a rounded end, fastener means interconnecting said spoons adjacent the rounded ends, said body portions diverging rearwardly from said fastener means, the portions of said spoons extending forwardly from the fastener means diverging forwardly to impart increased action to the fish lure, and a member extending between and interconnecting said spoons at a point spaced rearwardly from said fastener member.

9. A fish lure comprising a pair of egg-shaped spoons, said spoons having a body portion disposed substantially in a plane and having a relatively pointed end and a rounded end, a rivet interconnecting said spoons adjacent the rounded end, said body portions diverging rearwardly from said rivet, the portion of the spoons extending forwardly from the rivet diverging forwardly to impart increased action to the fish lure and a member extending between and interconnecting said spoons at a point spaced rearwardly from said rivet, the body portions of said spoons having a dimple formed therein at a point disposed between said rivet and said interconnecting member and the material forming said dimples extending inwardly toward the adjacent spoons and contacting the dimple on the adjacent spoon.

10. A fish lure comprising a pair of egg-shaped spoons, said spoons having a body portion disposed substantially in a plane and having a relatively pointed end and a rounded end, a rivet interconnecting said spoons adjacent the rounded end, said body diverging rearwardly from said rivet, the portion of the spoons extending forwardly from the rivet diverging forwardly to impart increased action to the fish lure, a member extending between and interconnecting said spoons at a point spaced rearwardly from said rivet, the body portions of said spoons having a dimple formed therein at a point disposed between said rivet and said interconnecting member, the material forming said dimples extending inwardly toward the adjacent spoons and contacting the dimple on the adjacent spoon, a fish hook attached to said interconnecting member, and a leader wire attached to said spoons adjacent said rivet.

CLYDE L. WAGNER.

(References on following page)

References Cited in the file of this patent

UNITED STATES PATENTS

| Number | Name | Date |
|---|---|---|
| D. 148,254 | Rooke | Dec. 30, 1947 |
| 104,930 | Chapman | July 15, 1870 |
| 395,103 | Wood | Dec. 25, 1888 |
| 536,185 | Cook | Mar. 26, 1895 |
| 613,519 | Junod | Nov. 1, 1898 |
| 646,916 | Pflueger | Apr. 3, 1900 |
| 1,551,677 | Malfet | Sept. 1, 1925 |
| 1,584,100 | Koepke | May 11, 1926 |
| 1,603,114 | Johnson | Oct. 12, 1926 |
| 1,822,785 | Petrie | Sept. 8, 1931 |
| 1,928,367 | Buddle | Sept. 26, 1933 |
| 2,266,234 | Mitchell | Dec. 16, 1941 |

FOREIGN PATENTS

| Number | Country | Date |
|---|---|---|
| 4,122 | Great Britain | of 1894 |
| 44,144 | Sweden | July 10, 1915 |